United States Patent [19]

Salgado et al.

[11] Patent Number: 4,964,395
[45] Date of Patent: Oct. 23, 1990

[54] APPARATUS AND METHOD FOR A SOLAR RADIATION WATER HEATER

[76] Inventors: Angel M. Salgado, 6060 W. Royal Palm Rd., Glendale, Ariz. 85302; Harold L. Drury, 3852 W. Dalphin Rd., Phoenix, Ariz. 85021

[21] Appl. No.: 268,004

[22] Filed: Nov. 7, 1988

Related U.S. Application Data

[63] Continuation-in-part of Ser. No. 932,938, Nov. 20, 1986, Pat. No. 4,782,816.

[51] Int. Cl.⁵ ............................................. F24J 2/04
[52] U.S. Cl. .................................. 126/437; 126/445; 126/450
[58] Field of Search ............... 126/437, 450, 432, 419, 126/422, 430, 444, 445

[56] References Cited

U.S. PATENT DOCUMENTS

| | | | |
|---|---|---|---|
| 4,014,314 | 3/1977 | Newton | 165/162 |
| 4,184,481 | 1/1980 | Turnquist | 126/447 |
| 4,191,165 | 3/1980 | Faudarele | 126/445 |
| 4,473,064 | 9/1984 | Jacques | 126/445 X |
| 4,480,635 | 11/1984 | Ostrovsky | 126/445 |
| 4,541,416 | 9/1985 | Leininger et al. | 126/432 X |

Primary Examiner—Larry Jones
Attorney, Agent, or Firm—William W. Holloway

[57] ABSTRACT

A solar water heater has a plurality of generally triangularly shaped panels, the panels being assembled in a pyramidal or prism shaped structure on top of a base structure. Each panel includes a planar transparent structure for permitting the passage of solar radiation therethrough. Coupled to the planar structure is a radiation absorbing member or multiplicity of radiation absorbing elements. The radiation absorbing member or elements are configured to form an enclosed structure so that water can flow, typically in channels, therebetween. An inlet is provided at the top of each panel and an outlet is provided at the bottom of each panel so that water can be introduced into the interior of the top of the panel and flows, under the influence of gravity, to the bottom of the panel, i.e., through the outlet. The solar radiation passing through the planar transparent structure is absorbed by the radiation absorbing member or elements, the radiation absorbing member or elements being heated thereby. The heat of the radiation absorbing member is transferred to the water. The radiation absorbing member has a channel structure fabricated to increase the length of time the water stays in contact with the radiation absorbing member or elements, thereby enhancing the heat transfer.

16 Claims, 3 Drawing Sheets

APPARATUS AND METHOD FOR A SOLAR RADIATION WATER HEATER

This is a continuation-in-part of copending application Ser. No. 06/932,938 filed on Nov. 20, 1986, now U.S. Pat. No. 4,782,816 issued Nov. 8, 1988.

BACKGROUND OF THE INVENTION

1. Field of the Invention

This invention relates generally to the heating of water and other fluids by solar radiation and, more particularly, to a solar radiation water heating device that is relatively compact, is generally omni-directional and can be fabricated in such a manner as to make the solar heating device easily transportable.

2. Description of the Related Art

The heating of water by solar radiation for applications involving relatively small amounts of fluid, such as the heating of family pools or providing warm or hot water at remote (e.g., cabin) locations, has typically involved coupling water conduits to solar panels which have been adapted and positioned to absorb solar radiation. The solar panels generally have large planar areas, limiting mobility of the panels and limiting the possible locations permitting suitable panel orientation with respect to the sun. Frequently, apparatus is added to the solar heater panels to provide a continuing tracking of the position of the sun for maximum radiation absorption during the course of the day, thereby adding complexity to the solar water heater configuration. The length of the conduits resulting from the distance between a suitable solar panel location and the site requiring the heated water can result in a requirement for a large pump in order to move the water through the heating system. When an attempt is made to increase the dimensions of the solar volume of heated water device for increased heating, these problems become correspondingly more difficult to solve.

A need has therefore been felt for a solar water heater that is relatively compact, that can be conveniently scaled upward in size for applications requiring the heating of larger amounts of water and that does not require a positioning element with respect to the sun.

FEATURES OF THE INVENTION

It is an object of the present invention to provide an improved solar water heating apparatus.

It is a feature of the present invention to provide a solar water heating apparatus that is relatively compact and portable.

It is yet another feature of the present invention to provide a solar water heater for which many of the components are comprised of flat panels, the solar water heater capable of being disassembled for convenient transportation or storage.

It is still another feature of the present invention to provide improved solar panels for increased heat transfer to the water.

It is a still further feature of the present invention to provide a solar water heater having a plurality of water heating panels, wherein the flow of water through each panel is separately controlled.

It is a further feature of the present invention to provide a solar water heater that does not have to be oriented with respect to incident solar radiation.

It is yet a further feature of the present invention to provide a solar water heater having a generally pyramidal structure.

SUMMARY OF THE INVENTION

The aforementioned and other features are attained, according to the present invention, by providing a solar water heater having a plurality of generally triangularly shaped water heating panels. The panels are positioned on top of a pedestal and form a pyramidal or prism shaped configuration extending in a vertical direction. Each panel has a transparent outer structure and a heat absorbing inner member or members. The solar water heater is configured to permit a flow of water, the water being enclosed on one side by the transparent outer structure, that insures contact by the water with the heat absorbing inner member(s). Solar radiation passes through the transparent outer structure and is absorbed by the heat absorbing inner member(s), thereby causing the absorbing inner member(s) to be heated. Water flowing through the panel is heated by contact with the heat absorbing inner member(s). Each panel has a water inlet at the top of the panel and a water outlet at the bottom of the panel. Water is introduced into the panel at the top and flows, under the influence of gravity, to the bottom of the panel. The interior of the enclosure through which the water passes is shaped to channel the flow of water and increase the time of contact between the flowing water and the heat absorbing inner member(s). The panels are supported by a pedestal structure in which the switches and pumps for moving the water are contained. The transparent outer member permits the transfer of radiation to the heat absorbing inner member(s) while reducing the loss of heat by the radiation absorbing structure to the ambient air environment. A sensor, located on each panel, controls the flow of water through the associated panel.

These and other features of the present invention will be understood upon reading of the following description along with the drawings.

BRIEF DESCRIPTION OF THE DRAWINGS

FIG. 4A is a perspective view of a solar panel according to a second embodiment of the present invention, while

DESCRIPTION OF THE PREFERRED EMBODIMENT

1. Detailed Description of the Figures

Figure 1:
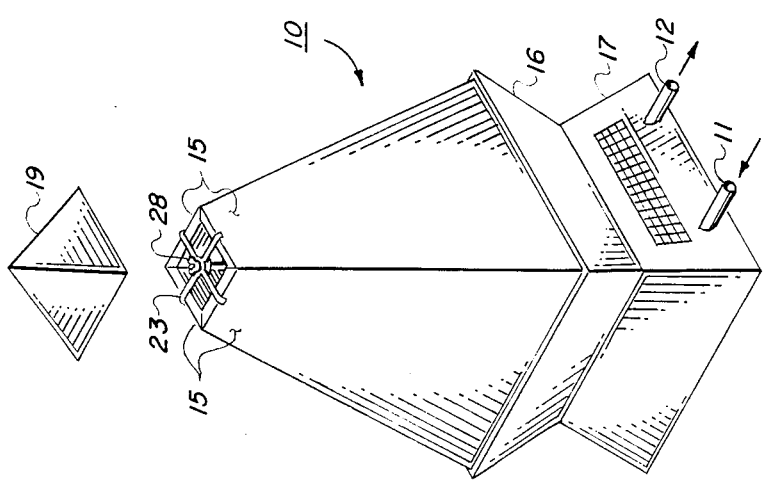
FIG. 1 is a perspective view of the assembled water heater according to the present invention.

Referring to FIG. 1, a perspective view of the solar heater 10 of the present invention is shown. Structurally, the assembled solar water heater 10 has three major components; a base section 17 supporting the remainder of the solar water heater 10, the base section being positioned on the ground or other suitable location surface; a pedestal section 16 supported by the base section 17; and a solar panel section comprised of a plurality of solar panels 15 supported by the pedestal section 16. A cap 19 can be removed to permit ventilation of the interior of the solar water heater 10 and to permit access to the apparatus which maintains the assembly of the solar panels. A water inlet pipe 11 and a water outlet pipe 12 extend from the base structure 17 and permit the circulation of water through the solar water heater 10.

Figure 2:
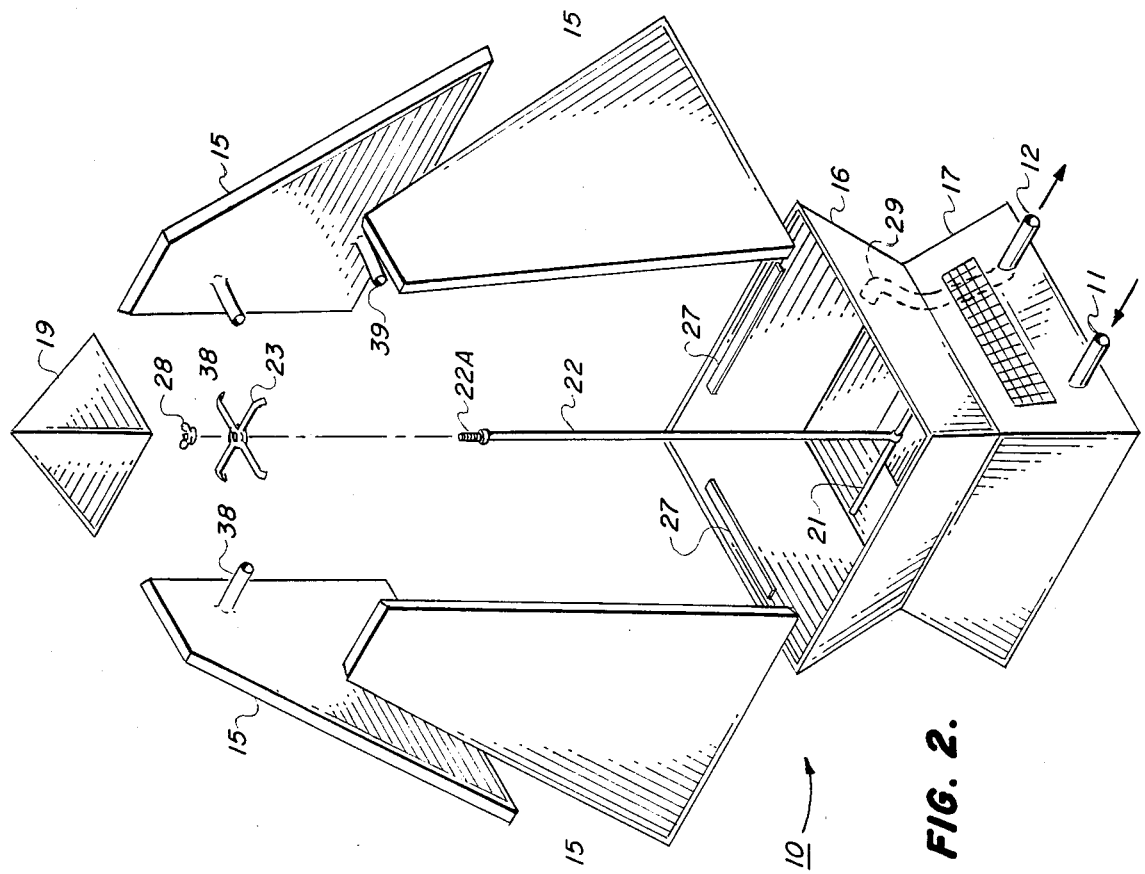
FIG. 2 is an exploded view of the solar water heater of the present invention illustrating the principal components.

Referring next to FIG. 2, an exploded view of the solar water heater 10 in shown. The base section 17 and pedestal section 16 can be permanently assembled or can be fabricated to be disassembled. Extending across the base/pedestal section 16 and 17 is an anchor rod 21. The solar panels 15 are removably coupled to the pedestal section 16 of the solar water heater. The structure of the base of the solar panels 15 permits the solar panels to be seated on structures 27 of the pedestal section 16. The solar panels 15 are the same size and, when positioned, overlap an end of the adjoining solar panels. Attachment rod 22 is coupled to the anchor rod 21 and passes through an aperture in attachment structure 23. The end 22A of the attachment rod 22 is threaded and a wing nut 24 or similar mechanism is screwed thereon. The attachment structure 23 has arms 23A that can engage the top portions of solar panels 15. As the wing nut 28 is tightened, the attachment structure 23 forces the solar panels 15 against the structures 27 of the pedestal section 16, preventing unintentional disassembly of the solar panels 15. An optional feature of the solar water heater is the presence of the conduit 29, indicated by dotted lines, the conduit 29 being thermally coupled to the interior of the base/pedestal sections 16/17 of the solar water heater 15. The water that flows through the solar water heater can be directed through this conduit for additional heating, the base/pedestal sections 16/17 being warmed by the solar radiation. Conduits 38 and 39 introduce water into and remove the water from the individual solar panels 15.

Figure 3:
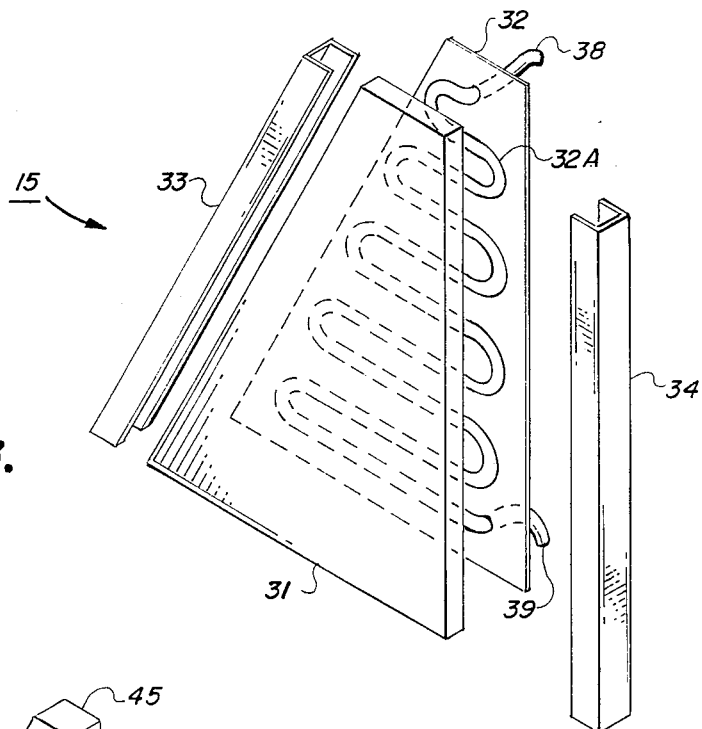
FIG. 3 is an exploded view of a solar panel illustrating the structure of the panel according to a first embodiment of the present invention.

Referring next to FIG. 3, a perspective exploded view of a solar panel 15, according to one embodiment of the present invention, is shown. The outer portion of the solar panel 15 is a transparent, planar, generally triangular (with the upper portion removed) panel 31 typically fabricated from a plastic material. In close proximity to the transparent panel 31 is a similarly shaped, but smaller panel 32 fabricated from a material having good thermal conduction characteristics. The surface of panel 32, facing the transparent panel 31, is treated, in the preferred embodiment, to enhance the absorption of incident radiation, e.g., by coloring the surface. The absorbing panel 32 has a continuous chanbel 32A structured therein and extending away from the transparent panel 31. This channel 32A is a guide for water flowing through the solar panel 15 and, because of the configuration, increases the time that water is in contact with radiation absorbing panel 32. The solar panels 15 have strips 33 and 34 applied to the sides of the panels 31 and 32 and, along with structure fabricated at the top and the bottom of the panels 31 and/or 32, provide an enclosed solar panel region, when panels 31 and 32 are coupled together, for confining the water flowing therethrough. The enclosed region of solar panel 15 has an inlet pipe 38 through which water is introduced to the top channel 32A. The enclosed region of solar panel 15 has an outlet pipe 39 through which water can exit from the enclosed region.

Figure 4A:
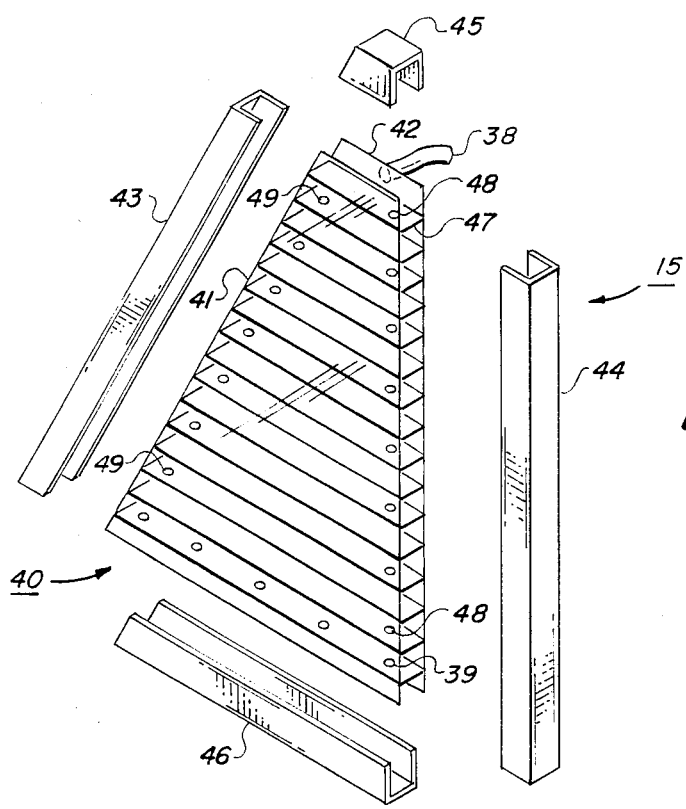
Figure 4B:
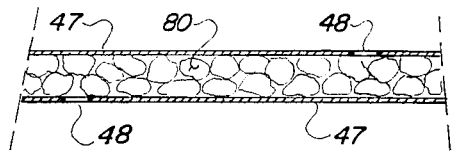
FIG. 4B illustrates the positioning of the heat absorbing inner members.

Referring next to FIG. 4A, a structure for a solar panel 15, according to another embodiment, for use in the solar water heater 10 is shown. Structure 40 has a front transparent front panel 41 and rear panel 42 which can also be transparent. Extending the entire width between the front panel 41 and the rear panel 42, and coupled thereto in a generally horizontal orientation, are a multiplicity of planar members 47. The planar members 47 have apertures 48 formed therein. The apertures 48 are positioned on opposite ends of the neighboring planar members. When the enclosing side members 43, 44, 45 and 46 are positioned, water introduced into the top of the panel 15 through inlet conduit 38 flows through channels formed by neighboring panels 47 and enters the next lower channel through an aperture 48. In this manner, the water flowing through the panel 15 traverses nearly the entire width of the panel in alternating directions and is removed from the panel through outlet conduit 39. Referring next to FIG. 4B, prior to assembly of the panel by attachment of the enclosing side members, radiation absorbing elements 80 are inserted in the channels formed by neighboring planar member 47. The radiation absorbing elements 80 have a structure which permits the flow of water through the channels. In the preferred embodiment, the radiation absorbing elements are copper crystals with the surfaces treated to enhance absorption of the solar radiation. The movement of the water through the (channels of the) panel is forced to contact the heat absorbing elements and heat is thereby transferred to the water.

Figure 5:
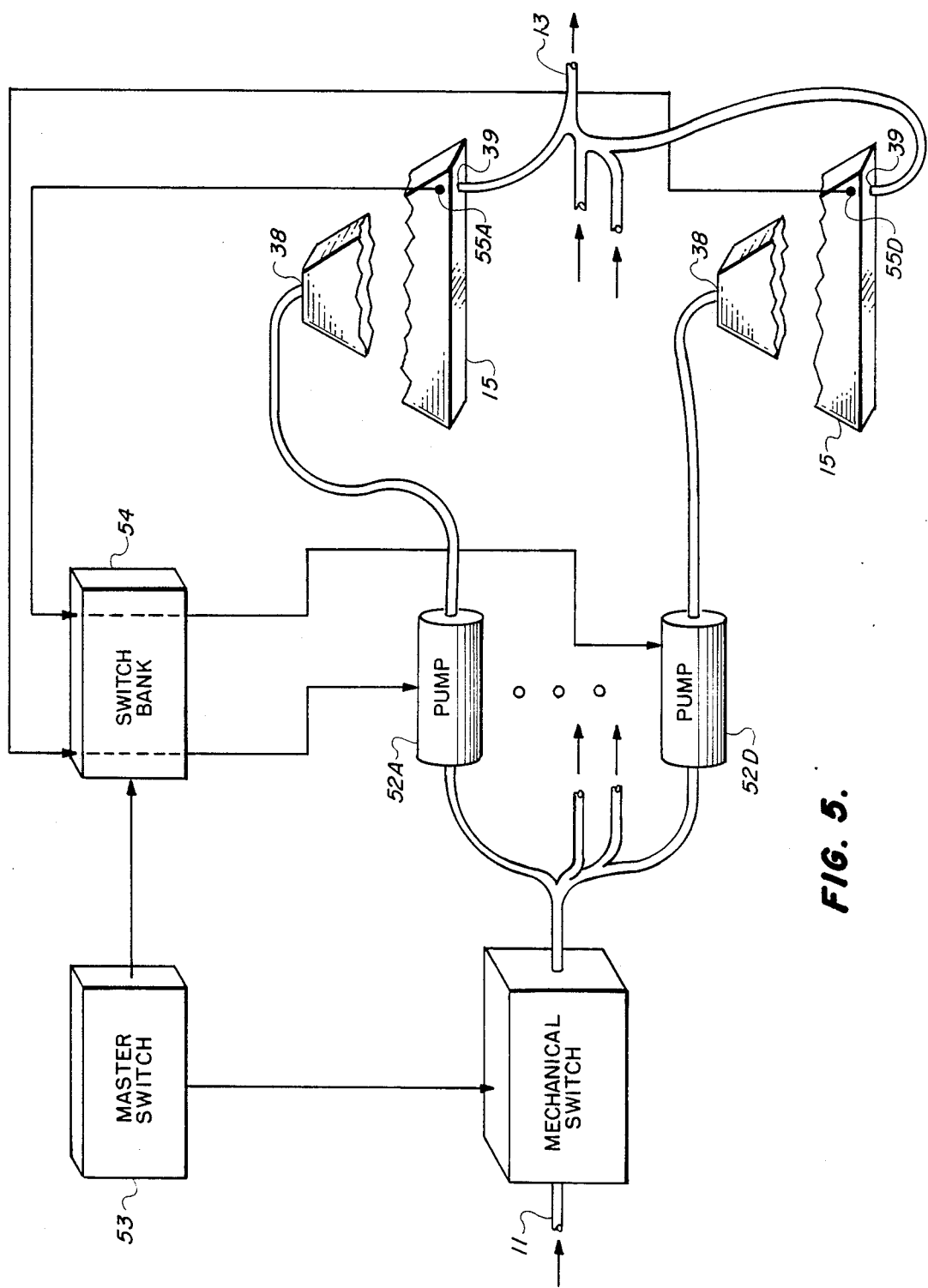
FIG. 5 is a schematic diagram illustrating the technique for controllably distributing water to the individual panels of the solar water heater.

Referring next to FIG. 5, a master electrical switch 53 (which can be controlled manually, by a timing circuit or by some other type of control circuit) activates mechanical switch 51. Activation of mechanical switch 51 permits water to flow therethrough. The activation of the master electrical switch 53 also provides an enabling signal to switch bank 54. In response to an activation signal from master electrical switch 53 and an appropriate signal from a sensor unit (55A-54D), a pump (52A-52D) associated with each sensor unit (55A-55D) is caused to operate. Each pump (52A-52D) delivers water to an associated solar panel 15 via inlet pipe 38. In the preferred embodiment, the sensor element provides an activation signal when the associated solar panel 15 reaches a predetermined temperature. Mechanical switch 51 is coupled to inlet pipe 11 and the water from each panel is applied to outlet pipe 12.

2. Operation of the Preferred Embodiment

The general operation of the solar water heater 10 of the present invention can be understood as follows. The solar radiation passes through the transparent enclosing structure 31 or 41 and is absorbed by the radiation absorbing structure 32 or the radiation absorbing elements 80 of each solar panel 15. When the solar panels 15 are sufficiently warm from the action of the radiation absorption, an associated pump (52A through 52D) is activated. The water is forced by the activated pump into an enclosed region of an associated solar panel 15 and subsequently flows through the solar panels 15. Thereafter, the water flows out of the solar water heater 10 through outlet pipe 12. During the flow through the solar panels 15, the heat resulting from the absorption of radiation is transferred to the water. The solar panels illustrated by FIG. 3 can be provided with a channeling structure 32A to increase the time that water remains in contact with the heat absorbing inner panel 32 and to insure that the water contacts a greater area of the panel 32. The granularity of the radiation absorbing elements 80 can control the flow of water through the solar panel 15 for the embodiment illustrated in FIG. 4A and FIG. 4B. To increase the efficiency of the heat transfer, a conduit having good thermal conductivity can be thermally coupled to the base/pedestal structure 16/17 as indicated by conduit 29 of FIG. 2. The flow of water from the solar panels can be directed through this thermal conduit prior to being removed from the solar water heater to augment the water heating. (The base/pedestal structure absorbs sufficient solar radiation to become warmer than the water exiting the solar water heater). The transparent panel 31 of each solar panel 15 causes the enclosed region to be heated in a manner commonly known as the "green-house" effect, i.e., the long wavelength thermal radiation is trapped within the structure. As indicated by the foregoing discussion, the preferred embodiment contemplates the use of pyramidal forms as the basic structure for the radiation absorbing structure and the enclosing structure. Indeed, the panels, in the preferred embodiment are typically equilateral triangles. However, departures from this structure are possible without compromising the performance of the structure. Furthermore, the pyramid form can be replaced by a prism form, including prism forms that are not symmetrical. Although the invention has been described in terms of the heating of water, it will be clear that any fluid material can be heated by this technique.

In the preferred embodiment, the radiation absorbing panel 32 of FIG. 3 is fabricated from stainless steel. This material is chosen for application of the invention in the swimming pool environment where corrosive chemical additives in the water can be present. However, other materials that permit the absorption of a substantial portion of the radiation by the radiation absorbing panel and the efficient transfer of the heat resulting from that radiation absorption to water flowing through the solar panel 15 can be used. As will be apparent from inspection of FIG. 2, the potentially bulkiest components of the solar heater, the base structure 17 and the pedestal structure 16 are comprised of planar components. These elements can be coupled in such a manner that they can be disassembled into the planar components for convenient storage or transportation. The control of the solar water heater 10 is accomplished by means of master electrical switch 53 and switch bank 44 in conjunction with the mechanical switch 51, the pump units 52A-52D and the sensor units 55A-55D. Activation of the master electrical switch 53 prepares the solar water heater for operation. To prevent the water from inadvertently being cooled, the pump associated with each solar panel 15 can be activated only when the panel exceeds a predetermined temperature as determined by the sensors 55A-55D coupled to each solar panel 15. Therefore, although the mechanical switch 51, activated by activation of the master electrical switch 53, permits water to flow therethrough, water does not actually flow until at least one pump is activated. It will be clear that as the position of the sun varies through the day, the particular panels through which water is flowing will change in response to the warming resulting from the incident radiation. Similarly, the currently active solar panel(s) will be a function of the seasonal orientation of the sun.

A further advantage of the present invention is the relatively compact structure lends itself to locations for which the typical solar panels may not be appropriate. The upright aspect of the radiation absorbing panel 15 provides a more flexible technique for intercepting solar radiation as compared to the typical solar panels. With the solar panel devices, concern must be directed to the (changing) direction of solar radiation, a problem that is less severe with the upright and relatively omni-directional nature of the solar heater 10 of the present invention. The dimensions of the solar heater 10 of the present invention can be altered relatively easily, the larger dimensioned solar heater being capable of increased water heating capacity. Indeed, the solar water heater of the present invention is suited for location on a building roof. When the water heater is positioned on a roof, the pedestal structure can be shaped to compensate for any roof slope. In addition, the upright orientation provides flexibility with the location of the water heater relative to the roof peak. For remote sites, the power source energizing the pump can be a battery, portable generator or the output of photovoltaic devices.

The solar panels are identical. When positioned on the pedestal member, the panels overlap to enclose an interior region. The cap 19 permits this interior region to be ventilated.

The foregoing description is included to describe the preferred embodiment and is not meant to limit the scope of the invention. The scope of the invention is to be limited only by the following claims. From the foregoing description, many variations will be apparent to those skilled in the art that would yet be encompassed by the spirit and scope of the invention.

What is claimed is:

1. A solar radiation water heater comprising:
   a plurality of generally triangularly shaped solar panels, each solar panel including:
   a transparent outer panel for transmitting radiation incident thereon;
   a inner panel generally parallel to said outer panel, said inner and said outer panel forming sides of an enclosed region;
   channel structure associated with said first and second panels for controlling flow in said enclosed region;
   radiation absorbing means for absorbing radiation transmitted through said outer panel, said radiation absorbing means having surfaces thereof exposed to said enclosed region;
   an inlet aperture permitting water to be introduced into said enclosed region;
   an outlet aperture permitting water to flow from said enclosed region, said water flowing through said enclosed region coming in contact with said radiation absorbing means;
   assembly means for securing said said solar panels in a generally pyramidal structure; and
   a pedestal structure, wherein said assembly means secures each solar panel with respect to said pedestal structure and with respect to other solar panels.

2. The solar radiation water heater of claim 1 further comprising:
   a temperature sensing means coupled to each solar panel; and
   pump means associated with each solar panel and coupled to said inlet aperture for said associated solar panel, said temperature sensing means coupled to a first solar panel activating a pump means associated with said first solar panel, said pump means causing water to flow through said first solar panel enclosed region when said temperature sensing means senses a temperature above a predetermined value.

3. The solar water heater of claim 2 wherein said channel structure is formed by generally parallel planar elements extending between said first and second panels and apertures in said planar elements at preselected locations, said radiation absorbing material being positioned in said channel structure.

4. The solar water heater of claim 3 wherein said radiation absorbing means includes radiation absorbing elements located in said channel structure.

5. The solar water heater of claim 1 wherein said solar water heater further comprises:
a base member for supporting said pedestal structure, wherein said pedestal member has a larger top area than bottom area.

6. The solar water heater of claim 1 wherein said inner panel is fabricated from said radiation absorbing means, said inner panel including a conduit structure, said channel structure being formed by said outer panel and said conduit structure.

7. The solar water heater of claim 1 wherein said channel structure is formed by generally parallel planar structures extending between said first and said second panels and apertures in predetermined locations in said planar structures, wherein said radiation absorbing material is positioned in said channel.

8. The solar water heater of claim 7 further comprising temperature sensor means coupled to each solar panel, said sensor means being coupled to said control means for enabling water to flow through a solar panel channel structure for a solar panel coupled to said sensor means when a temperature of said solar panel coupled to said temperature sensor means exceeds a predetermined value.

9. The solar water heater of claim 7 further comprising a conduit for water from a solar panel in thermal contact with said pedestal.

10. The solar water heater of claim 7 wherein said second panel is fabricated from said radiation absorbing material, said second panel having a channel formed therein, said channel structure being formed by a region between said first panel and said second panel channel.

11. The solar water heater of claim 8, wherein said solar panels are generally triangular in shape.

12. The solar water heater of claim 11 further comprising a base structure supporting said pedestal structure.

13. The solar water heater of claim 1 wherein said assembly means includes:
a rod coupled to said pedestal structure;
a grasping structure for engaging said plurality of solar panels, said grasping structure being removably coupled to said rod; and
tightening member for controlling a force exerted by said grasping member on said plurality of solar panels.

14. A solar water heater comprising:
a plurality of generally flat solar panels, each of said solar panels including:
a first panel for transmitting selected radiation components therethrough,
a second panel coupled to said first panel for forming an enclosed region through which water is constrained to flow, and
radiation absorbing material, wherein each said enclosed region includes a channel structure, said channel structure controlling a flow of said water through said enclosed region, said flow of water through said channel coming in contact with said radiation absorbing material, said channel structure forcing said flow of water to come in contact with said radiation absorbing material;
control means for controlling a flow of water through said region;
assembly means for securing said plurality of solar panels in a generally pyramidal structure; and
a pedestal structure, wherein said assembly means secures each solar panel with respect to said pedestal structure and with respect to other solar panels.

15. A solar water heater comprising:
a plurality of solar panels, each of said solar panels including:
a first panel for transmitting selected radiation components therethrough,
a second panel coupled to said first panel for forming an enclosed region through which water is constrained to flow, and
radiation absorbing material, said enclosed region having said radiation absorbing material forming a boundary thereof, wherein each said enclosed region includes a channel structure, said channel structure controlling a flow of said water through said enclosed region, said flow of water through said channel coming in contact with said radiation absorbing material;
control means for controlling a flow of water through said region;
assembly means for securing said plurality of solar panels in a generally pyramidal structure; and
a pedestal structure, wherein said assembly means secures each solar panel with respect to said pedestal structure and with respect to other solar panels.

16. The solar water of claim 15 wherein said assembly means includes:
a rod coupled to said pedestal structure;
a grasping structure for engaging said plurality of solar panels, said grasping structure being removably coupled to said rod; and
tightening member for controlling a force exerted by said grasping member on said plurality of solar panels.

* * * * *